May 14, 1935.　　　B. BURNS ET AL　　　2,001,322
MULTIPLE FILM HANDLING DEVICE
Filed April 25, 1931　　　3 Sheets-Sheet 2
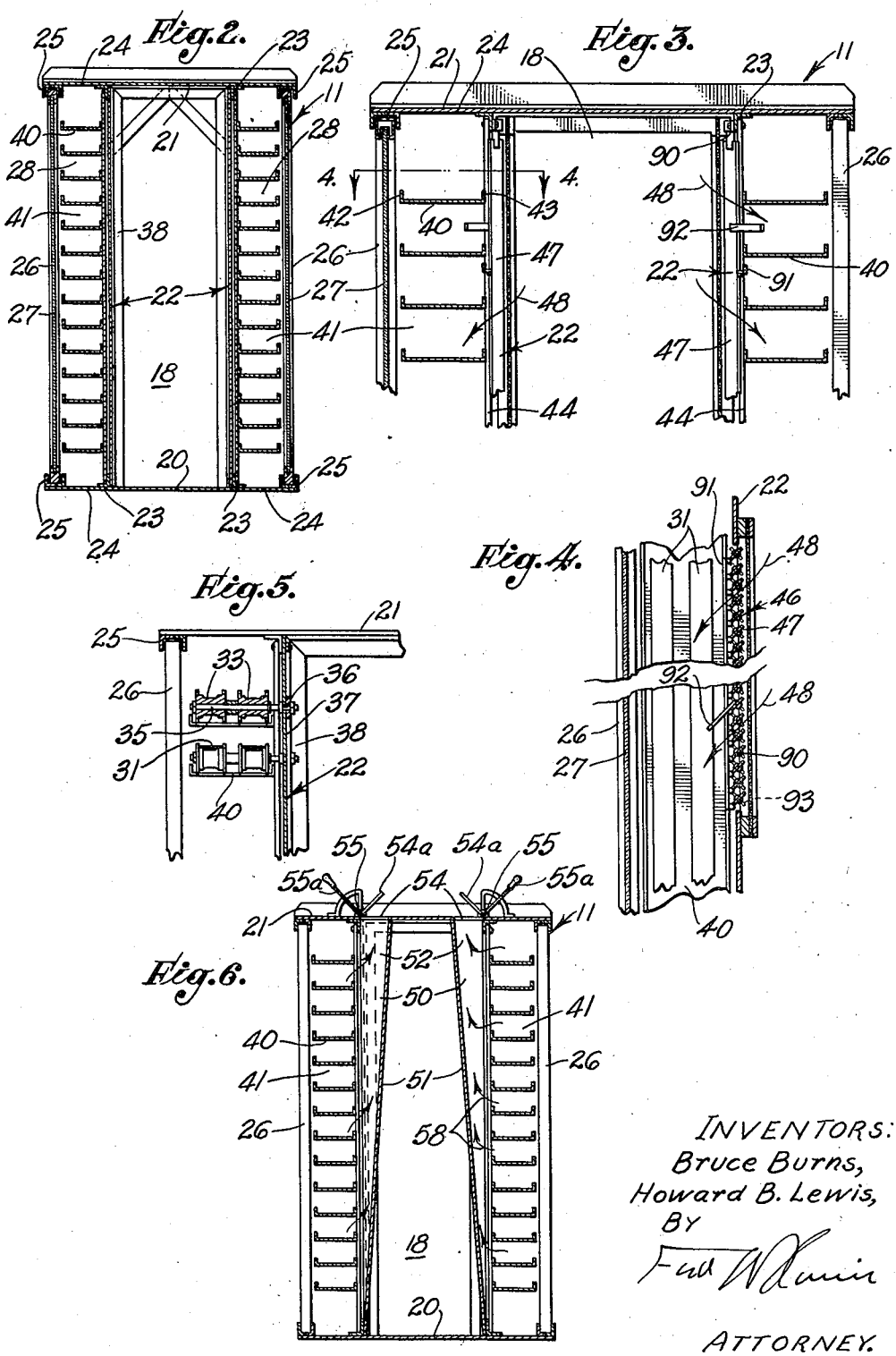

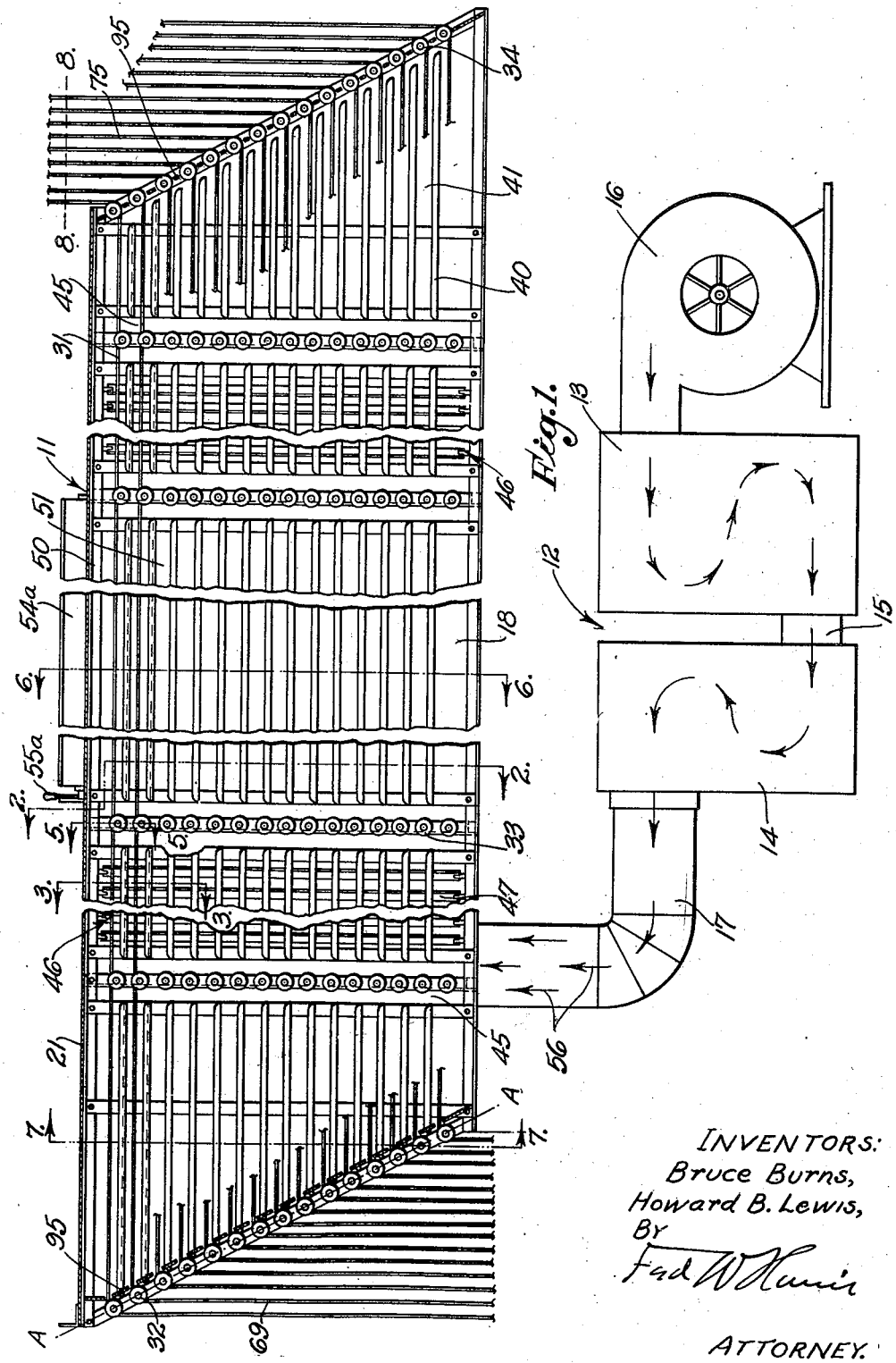

May 14, 1935.  B. BURNS ET AL  2,001,322
MULTIPLE FILM HANDLING DEVICE
Filed April 25, 1931  3 Sheets-Sheet 3

INVENTORS:
Bruce Burns,
Howard B. Lewis,
BY
ATTORNEY.

Patented May 14, 1935

2,001,322

UNITED STATES PATENT OFFICE 2,001,322

MULTIPLE FILM HANDLING DEVICE

Bruce Burns and Howard B. Lewis, Los Angeles, Calif., assignors, by mesne assignments, to Hughes Industries Co., Ltd., Los Angeles, Calif., a corporation of Delaware Application April 25, 1931, Serial No. 532,809

7 Claims. (Cl. 34—48)

Our invention relates to motion picture film handling equipment, and relates particularly to a film handling device which may be employed as a drier or for the purpose of exposing film to gases or gas-containing atmospheres. In view of the fact that our present invention is especially valuable as a drier for motion picture film which has been previously carried through a process such as developing and washing, or coloring, the invention will be hereinafter disclosed principally as a motion picture film drier adapted to dehydrate a relatively large number of film strips simultaneously.

It is an object of our invention to provide a device of this character including passages and means for guiding films to be treated through the passages, together with means for conditioning air and causing this conditioned air to flow through the film passages so as to engage the faces of the films.

A further object of the invention is to provide a simple form of film treating device having an elongated duct with film passages or channels formed in the exterior walls of the duct, and having adjustable louvers or other aperture means in the wall structure of the duct for conducting atmosphere from the interior of the duct into the film passages or channels.

It is a further object of the invention to provide a duct having substantially vertical or upright side walls, film guide means for guiding film horizontally along the exterior faces of the side walls, horizontal wall members extending outwardly from the side walls between the longitudinally guided film forming longitudinal channels in which the films travel, cover members placed vertically in spaced relationship to the side walls of the duct so as to enclose a film space or passage on the side of the duct, it being preferable to provide these cover members with glass panes through which the film may be viewed as it travels through the film channels, and openings in the side walls of the duct for conducting fluid or gas from the duct into the film channels.

It is a further object of the invention to provide a construction which permits changes to be readily made in the direction of air flow relative to film travel, or the proportion of air which is introduced at different points along the course of the film path.

A further object of the invention is to provide a simple, inexpensive, and practical construction wherein the foregoing and other objects of the invention may be embodied, this construction being described hereinafter.

Further objects and advantages of the invention will be made evident throughout the following part of the specification.

Referring to the drawings, which are for illustrative purposes only,

Fig. 1 is an elevational view with the cover or outer wall members of the film handling device, removed.

Fig. 2 is a cross section on a plane represented by the line 2—2 of Fig. 1.

Fig. 3 is an enlarged fragmentary cross section on a plane represented by the line 3—3 of Fig. 1.

Fig. 4 is a fragmentary enlarged longitudinal section on a plane represented by the line 4—4 of Fig. 3.

Fig. 5 is an enlarged fragmentary section on a plane represented by the line 5—5 of Fig. 1.

Fig. 6 is a cross section on a plane represented by the line 6—6 of Fig. 1.

Figure 8:
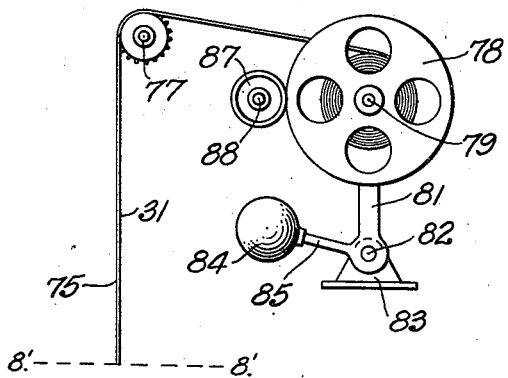

Fig. 8 is a detail of diagrammatic character showing a pulling and winding device which may be employed to move the film strips through the film treating device, the elements shown in Fig. 8 being positioned adjacent the line 8—8 of Fig. 1 when the line 8'—8' of Fig. 8 is placed so as to coincide with the line 8—8 of Fig. 1.

As shown in the drawings, the preferred embodiment of our invention includes a film carrying means 11 and a means 12 for conditioning a fluid or gas which is to be moved in engagement with the film carried by the means 11, this fluid conditioning means 12 consisting in this embodiment of the invention of an air drier 13 and a temperature stabilizer 14 interconnected by a duct 15. A fan or blower 16 forces air through the drier 13 which dehumidifies the air by use of refrigeration. The air then passes through the temperature stabilizer 14 which has heating coils for raising the air to a desired temperature, and the air then passes through an air conduit 17 to an elongated air duct 18 forming part of the film carrying means 11.

The air duct 18 may vary in length from fifty feet to several hundred feet, depending upon the character of treatment to be given the film and also depending upon the speed at which the film is to be moved through the device. The duct 18 includes a bottom wall 20, a top wall 21, and side wall structures 22 which are substantially vertical and are secured by means of longitudinal angles 23 in position spaced within the edges of the walls or plates 20 and 21 so that edge portions 24 of the bottom and top walls 20 and 21 project horizontally beyond the upright or vertical wall structures 22, as shown in Fig. 2. Along the edges of the edge portions 24, channel members 25 are secured, and in these channel members staggered or overlapping sliding doors 26 equipped with glass panes 27 are mounted, these glass doors 26 providing the cover members or outer walls of film passages 28 which extend along the side wall structure 22 of the duct 18.

Film guide means for guiding a plurality of films 31 longitudinally in superimposed relationship through the film passages 28 are provided in the form of inlet rollers 32, intermediate rollers 33, and outlet rollers 34. As best shown in Fig. 5, these rollers 33 are mounted on stub shafts 35 which project horizontally from the side wall structures 22. In Fig. 5, the inner ends of the stub shafts 35 project through openings 36 in a vertical plate 37 and a flange of a reinforcing angle member 38 forming part of the side wall structures 22, but various other methods of mounting the rollers 32, 33, and 34 may be readily employed.

Between the films 31, horizontal wall members 40 extend laterally from the side wall structures 22 into the film passages 28, thus dividing the film passages 28 into a plurality of longitudinal film channels 41 through which the individual lengths of film 31 travel. The dividing walls 40 are made in the form of flat trays having upturned flanges 42 and 43 along the edges thereof, the inner flanges 43 being secured to vertical bars 44 which are in turn secured to and form part of the side wall structures 22. The dividing walls 40 are not continuous throughout the entire length of the passages 28 but are interrupted, as shown in Fig. 1, so as to provide vertical spaces 45 in which the rollers 33 and their supporting shafts 35 are positioned.

As shown in Figs. 1, 3 and 4, the side wall structures 22 include a number of louver sections or aperture means 46 having vertically extended pivoted louvers 47 providing variable passages communicating between the interior of the duct 18 and the film passages so that fluid, such as conditioned air, may pass from the duct 18 into the channels 41 formed in the film passages 28 by the walls 40, as indicated by arrows 48 of Fig. 4. Following the louver sections, as indicated in Figs. 1 and 6, the side wall structures 22 include exhaust or fluid outlet sections 50 which consist of inwardly sloping longitudinal walls 51 and upwardly diverging triangular end walls 52 forming, in communication with the film channels 41, the upwardly diverging outlet or exhaust passages 50 having their outlets 54 in the top wall 21 of the duct 18, as best shown in Fig. 6, and being equipped with doors or closure means 54a pivoted at 55 and having handles 55a. The treating fluid or conditioned air passes into the duct 18 through the delivery member 17, as indicated by arrows 56, and travels rearwardly or rightwardly through the duct 18, portions of this treating fluid passing outwardly through the respective louver sections 46 into the film channels 41 of the film passages 28 in proportions controlled by the setting of the louvers 47, travels along the film channels 41, producing therein a desired treatment of the lengths of film 31, and discharges into the open atmosphere through the fluid outlets 50, as indicated by arrows 58 in Fig. 6. It will be recognized that the number and size of the louver sections 46 and outlet sections 50 may be varied in accordance with the length of the treating device and the type of treatment for which the device is to be employed.

Figure 7:
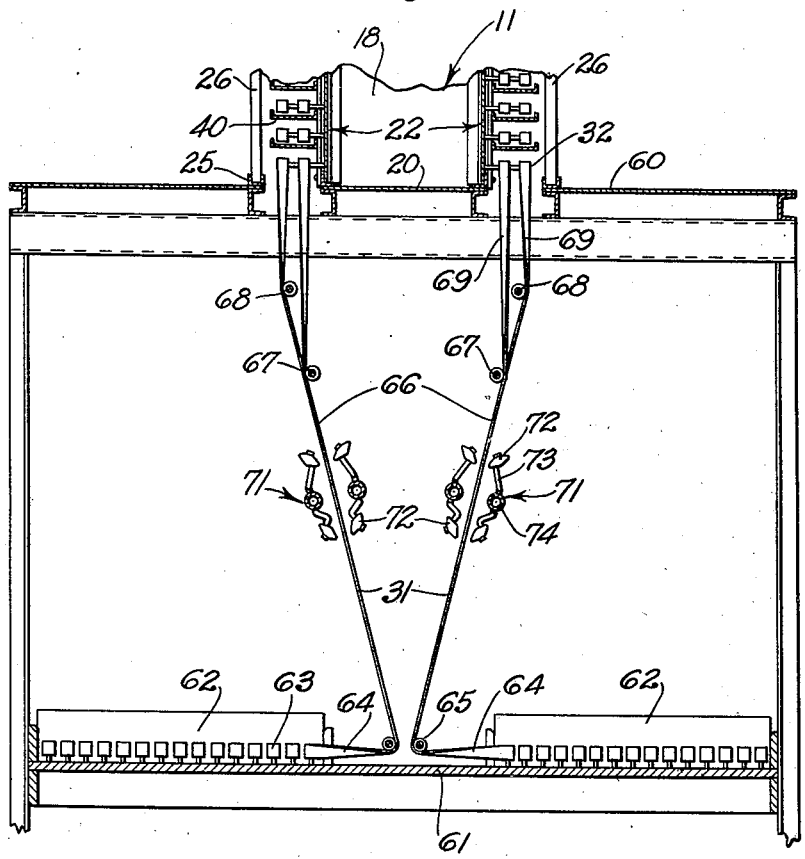
Fig. 7 is a sectional detail taken on a plane represented by the line 7—7 of Fig. 1.

Although the manner in which the films 31 are conducted into the treating or drying device is of small importance, we have shown diagrammatically in Fig. 7 the lower portion of a film handling device 11 mounted on a floor 60. On a lower floor 61 are mounted preliminary film treating devices 62, such as developers, fixers, and washers, these preliminary film treating devices having a plurality of rollers 63 over which the films 31 are directed from a longitudinal line of movement to a lateral line of movement such as indicated at 64. These films 31 travel laterally as indicated at 64 to turn-up rollers 65, from which they are carried upwardly through diverging paths, as indicated at 66, and adjacent pairs of the films 31 are carried over rollers 67 and 68 from which the pairs of films pass, as indicated at 69, to inlet rollers 32 which are mounted in pairs as shown and are disposed in offset relationship as shown in Fig. 1, so that the axes of the rollers 32 will lie in a sloping plane A—A. In side elevation, the portions of the films indicated at 69 are disposed substantially as shown in Fig. 1. The intermediate rollers 33 are spaced sufficiently close together to prevent sagging of the films into engagement with the horizontal wall members 40 during the operation of the device. Ample tension to hold the films 31 taut is exerted by pulling means placed at or adjacent the rightward or outlet end of the device for the purpose of pulling the films 31 through the drier and also through the previous treatment to which the films are subjected.

In Fig. 7 we have shown preliminary dehydrating means 71 consisting of air nozzles 72 which are connected through pipes 73 with air headers 74. These air nozzles direct blasts of air downwardly against the faces of the films 31 and remove free liquids therefrom so that when the films enter the drying device, there are practically no drops of water thereon, and the moisture then to be removed from the films is that which has been absorbed into the film structure.

From the outlet rollers 34 shown in Fig. 1, the films 31 are conducted, as shown at 75. In Fig. 8 we diagrammatically show one of the films 31 extending over a sprocket 77 which forms a pulling device for pulling the film in a manner to produce movement thereof through the developing, washing, and drying steps of a film treatment. From the sprocket 77, the film is carried to and wound on a reel 78 mounted on a stub shaft 79 carried by an arm 81 pivoted at 82 to a base or bracket 83. A weight 84, secured to the arm 81 by means of an arm 85, tends to rotate the arm 81 in leftward direction so as to hold the film reel against a friction driving spool 87 which is mounted on a shaft 88. This diagrammatic disclosure, Fig. 8, is merely for the purpose of showing one form of pulling means which may be used in the practice of our invention. It is to be understood that each of the films 31 extends to a pulling sprocket 77 and is then wound upon its individual film reel 78, but owing to the fact that there are many ways in which the films may be pulled or wound, this part of the invention is shown as simply as possible.

The louvers 47 have pivots 90 at the upper and lower ends thereof establishing vertical axes of rotation for the louvers 47, and they are linked together by a bar 91 so that they will all swing in unison. A projecting handle 92 enables the operator to swing these louvers 47 from closed position through the positions in which they are shown in full lines in Fig. 4 to oppositely faced positions, such as indicated by dotted lines 93. By manipulation of the louvers, the direction of the air discharged into the film channels may be controlled so as to be either forwardly or rearwardly, or a number of louver sections 46 and a number of outlets 54 may be entirely closed off so as to cause the air to travel a considerable distance along the film passages before being discharged. As shown in Fig. 1, the ends of the film channels are blocked off by walls 95 which restrict the passage of air through the ends of the film passages. Therefore, it is possible by opening the first louver, closing all of the remaining louvers, opening the door 54a of the last outlet 54, and closing the rest of the outlets 54, to cause the air to enter the front ends of the film passages and to travel the full length thereof before being discharged into the open.

Although we have herein shown and described our invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

We claim as our invention:

1. A film handling device of the character described, including: walls forming an elongated horizontal duct having an upright side wall structure; a film passage formed along said side wall structure, there being removable cover means forming the outer wall of said film passage and a plurality of horizontal walls extending from said side wall structure so as to form a plurality of film channels in said film passage; aperture means in said side wall structure providing communication between said duct and said film passage; wall members forming part of said side wall structure and sloping upwardly towards each other and being placed so as to form upwardly enlarging fluid outlet passages connecting with said film channels; and means for producing a flow of fluid through said aperture means.

2. A film handling device of the character described, including: walls forming an elongated horizontal duct having an upright side wall structure on each side thereof; a film passage formed along each of said side wall structures, said side wall structure providing a side wall of each of said passages and having portions converging upwardly to outlets from said film passages; aperture means in said side wall structure on each side of said outlets and providing communication between said duct and said film passages; means for producing a flow of fluid through said aperture means; and control means for varying the rate of flow of fluid through said aperture means.

3. A film handling device of the character described, including: walls forming an elongated horizontal duct having an upright side wall structure on each side thereof; a film passage formed along each of said side wall structures, said side wall structure providing a side wall of each of said passages and having portions converging upwardly to outlets from said film passages; aperture means in said side wall structure on each side of said outlets and providing communication between said duct and said film passages; means for producing a flow of fluid through said aperture means; and control means associated with each of said aperture means for varying the quantity and direction of flow of fluid into said film passages.

4. A film handling device of the character described, including: walls forming an elongated horizontal duct having upright sides; a film passage formed along each of said upright sides; aperture means in said upright sides providing communication between said duct and said film passages; supporting means associated with said upright side walls for supporting a plurality of films during their horizontal movement through said passages; and a plurality of rollers for directing said films onto said supporting means, the plane of the axes of said rollers declining towards the outlet end of said passages.

5. A film handling device of the character described, including: walls forming an elongated horizontal duct having an upright side wall structure; a film passage formed along said side wall structure; a plurality of horizontal walls disposed within said film passage in spaced vertical relationship to form a plurality of film channels therethrough; a plurality of film supports associated with each of said horizontal walls and so disposed as to carry a separate motion picture film out of contact with said horizontal wall; means for pulling said separate motion picture films through each of said film channels while said films are carried by said film supports in their respective film channels; aperture means in said side wall structure providing communication between said duct and said film passage; and means for producing a flow of fluid through said aperture means.

6. A film handling device of the character described, including: walls forming an elongated horizontal duct having an upright side wall structure; a film passage formed along said side wall structure, there being removable cover means forming the outer wall of said film passage and a plurality of horizontal walls extending from said side wall structure so as to form a plurality of film channels in said film passage; a plurality of rollers associated with each of said horizontal walls and so disposed as to support a separate motion picture film out of contact with said horizontal wall; means for pulling said separate motion picture films through each of said film channels while said separate films are supported by said rollers in said respective film channels; aperture means in said side wall structure providing communication between said duct and said film passage; and means for producing a flow of fluid through said aperture means.

7. A film handling device of the character described, including: walls forming an elongated horizontal duct having an upright side wall structure; a film passage formed along said side wall structure, there being removable cover means forming the outer wall of said film passage and a plurality of horizontal walls extending from said side wall structure so as to form a plurality of film channels in said film passage; a plurality of rollers associated with said horizontal walls; means for pulling a separate film through each of said film channels; an aperture in said side wall structure having a plurality of adjustable louvers therein; means for introducing a flow of fluid into said duct and through said louvered aperture; and a fluid outlet passage for allowing said fluid to escape from said film passage.

BRUCE BURNS.
HOWARD B. LEWIS.